Aug. 20, 1929.  W. B. SWAN  1,725,225

DISPLAY BOARD

Filed Jan. 13, 1928

Inventor
William B. Swan
By Wooster & Davis
Attorneys

Patented Aug. 20, 1929.

1,725,225

UNITED STATES PATENT OFFICE.

WILLIAM B. SWAN, OF SEYMOUR, CONNECTICUT.

DISPLAY BOARD.

Application filed January 13, 1928. Serial No. 246,481.

This invention relates to an apparatus for displaying articles offered for sale, or samples, or advertisements and the like, and has for an object to provide a device of this character which will display the articles in a position where they may be easily examined and all may be examined from a single position.

It is also an object of the invention to provide a display device having a plurality of display panels with a constantly running driving mechanism for alternately reversing or turning the respective panels in opposite directions to expose the opposite sides thereof, and so arranged that the panels will be operated alternately so that while one is turning the other is stationary to give an effect which will attract attention.

Figure 1:
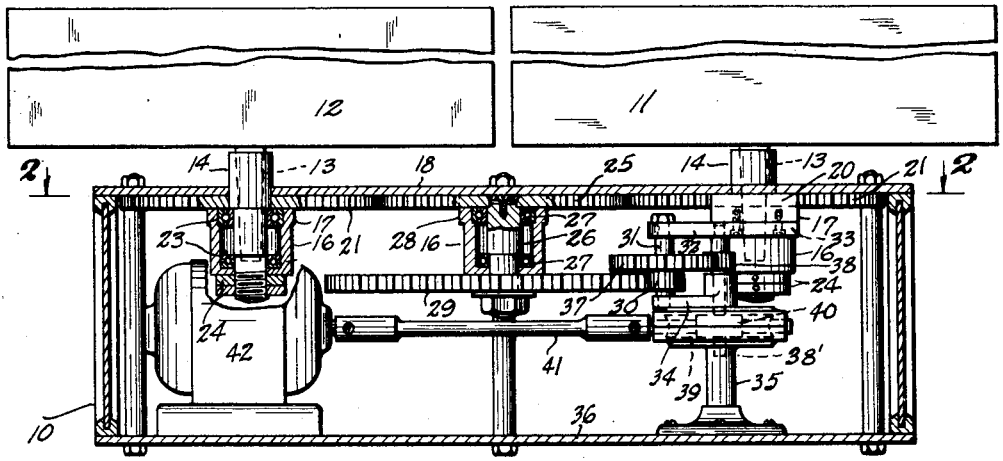

With the foregoing and other objects in view, I have devised the construction illustrated in the accompanying drawing forming a part of this specification. In this drawing, Fig. 1 is a vertical section substantially on line 1—1 of Fig. 2 showing the display panels in elevation but showing the mounting for one of the display panels and the central drive in section, and Fig. 2 is a horizontal section substantially on line 2—2 of Fig. 1 showing the drive mechanism with the top wall of the enclosing casing removed.

The drive mechanism is enclosed within a suitable casing or cabinet 10 which may be mounted on suitable supporting legs or set on the top of a table or counter, and the driving mechanism is enclosed within this cabinet. The device illustrated comprises two display panels 11 and 12 mounted to rotate about upright spaced axes. A convenient way of mounting them is to provide tapered pins 13 on their supports at their lower ends adapted to seat in similarly tapered openings in a carrier 14 mounted to rotate about an upright axis. This carrier projects down into a cylindrical body portion 16 of a bracket 17 mounted on the under side of the top wall 18 by any suitable means, such as screws 19, the arm of the bracket being provided at its opposite ends with spacing bosses or feet 20 to space the body of the bracket and arms from the wall 18 to provide space for the driving gear 21 which is keyed to the carrier 14, as indicated at 22. The carrier is mounted to rotate in the bracket 17 and has suitable ball bearings 23 therein, and is held in place by suitable nuts or washers 24 on its lower end engaging the lower end of the body 16.

Mounted between the two gears 21 for driving the respective panels is a main drive gear 25 mounted on a carrier or short shaft 26 mounted by the roller bearings 27 in a bracket 28 similar to the brackets 16. At the lower end of the shaft 26 is secured a gear 29 meshing with the pinion 30 on a short shaft 31. Mounted at its upper end is an arm 32 secured to the right hand bracket 17 as by screws 33, and this shaft has a lower bearing in the arm 34 in an upright support 35 mounted on the lower wall 36 of the cabinet. This short shaft 31 also has a gear 37 meshing with a pinion 38 on an upright shaft 38' in the support 35. This upright shaft also has secured to it a worm gear 39 meshing with a worm 40 mounted on the armature shaft 41 of an electric motor 42 which is controlled by suitable switch mechanism, not shown, and driven by current from any suitable source of supply.

Figure 2:
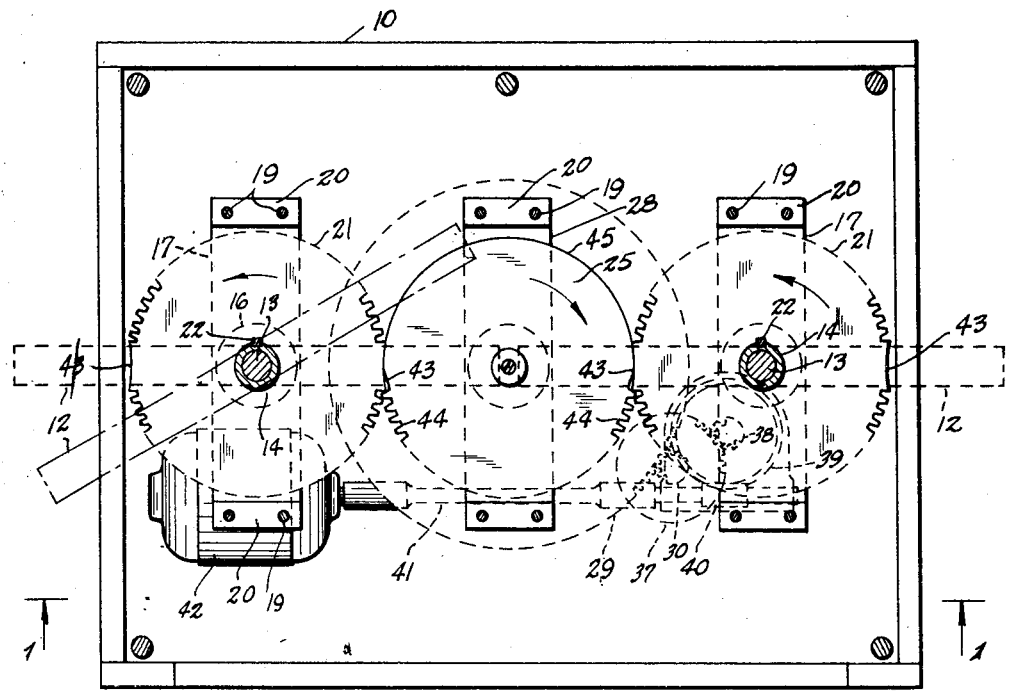

It will be noted from an inspection of Fig. 2 that the two drive gears 21 for the panels are provided in diametrically opposite sides thereof with curved walls 43 without gear teeth, and the central gear 25 has teeth 44 only on one side thereof while the other side 45 is a circular wall with the axis of the shaft 26 at the center, this circular wall being preferably substantially a continuation of the center or pitch line of the gear teeth, and the toothless portions 43 of the two gears 21 are curved substantially on the same curve as is the guide wall 45 of the central gear.

When the device is operated the motor and the drive gears up to the central gear 25 rotate continuously at a substantially constant speed, and while the plain side 45 of the central gear is toward either one of the gears 21, the gears 21 will not be rotated by the gear 25. At this time the plain side 45 of the central gear will run in or adjacent the curved plain walls 43 of gear 21 and will, therefore, lock the gear and the display panel connected to it against rotation. However, as the central gear 25 rotates, its teeth 44 will eventually come to the side of the curved portion 43 and will mesh with the teeth of the gear 21. The number of teeth on the gear 25 will be the same as the number of teeth on each side of the gears 21 between the curved plain portions 43. Therefore, the teeth 44 on the central gear will alternately mesh with the teeth on one side of the gears 21, but will mesh first with one gear 21 and then the other gear alternately and will rotate these gears and their display panels alternately one-half revolution in opposite directions, and while one gear 21 and its panel is turning this half revolution the other gear 21 and its panel will be held stationary by the plain side 45 of the central gear running in one of the curved surfaces 43 of the panel gear. Therefore, although the motor driven drive mechanism operates continuously, the two panels are rotated in opposite directions alternately a half revolution at a time, and while one panel is turning the other is stationary. This operation exposes both sides of the panel alternately to view from the front of the device, and the peculiar operation will attract attention to the display. It will also be noted the drive mechanism is very simple and effective and not likely to be easily gotten out of order or fail.

Having thus set forth the nature of my invention, what I claim is:

1. In a display device, a pair of display panels mounted to rotate about spaced substantially parallel axes, and means for rotating said panels in opposite directions one half revolution at a time and alternately, said means including means for holding each panel stationary while the other is turning.

2. In a display device, a pair of display panels mounted to rotate about spaced upright axes, and a single operative means arranged between the axes of the panels for rotating said panels with a step by step movement, said means being arranged to operate the panels alternately so that each panel is stationary while the other is turning.

3. In a display device, a pair of spaced display panels mounted to rotate about upright axes, driving gears connected to said panels having portions of their peripheries without teeth, a third gear having teeth in only a portion of its periphery arranged to mesh alternately with the first mentioned gears, and means for driving the third gear.

4. In a display device, a pair of spaced rotatable display panels, a constantly running operating mechanism, including a single driving member located between the axes of the panels and driving connection from said driving member to the panels capable of rotating the respective panels in opposite directions and alternately a partial revolution at a time.

5. In a display device, drive mechanism including a main gear having teeth in one side of its periphery and a plain curved surface on the other side, a pair of gears arranged on opposite sides of the first gear and each having on opposite sides of its periphery convex surfaces to cooperate with the plain curved surface of the first gear to hold the second gears stationary, said pair of gears being also provided with teeth between the curved surfaces to mesh with the teeth of the first gear, and display panels operatively connected with the pair of gears.

6. In a display device, a base comprising a cabinet adapted to rest on a support, a pair of spaced supports mounted in said cabinet to turn about upright axes, upright display panels carried by said supports above the cabinet, driving means in the cabinet for turning one of said supports a half revolution in one direction and then the other support a half revolution in the opposite direction alternately and including means for holding each support stationary while the other support is turning, and continuously running means for operating the driving means.

In testimony whereof I affix my signature.

WILLIAM B. SWAN.